Patented May 10, 1927.

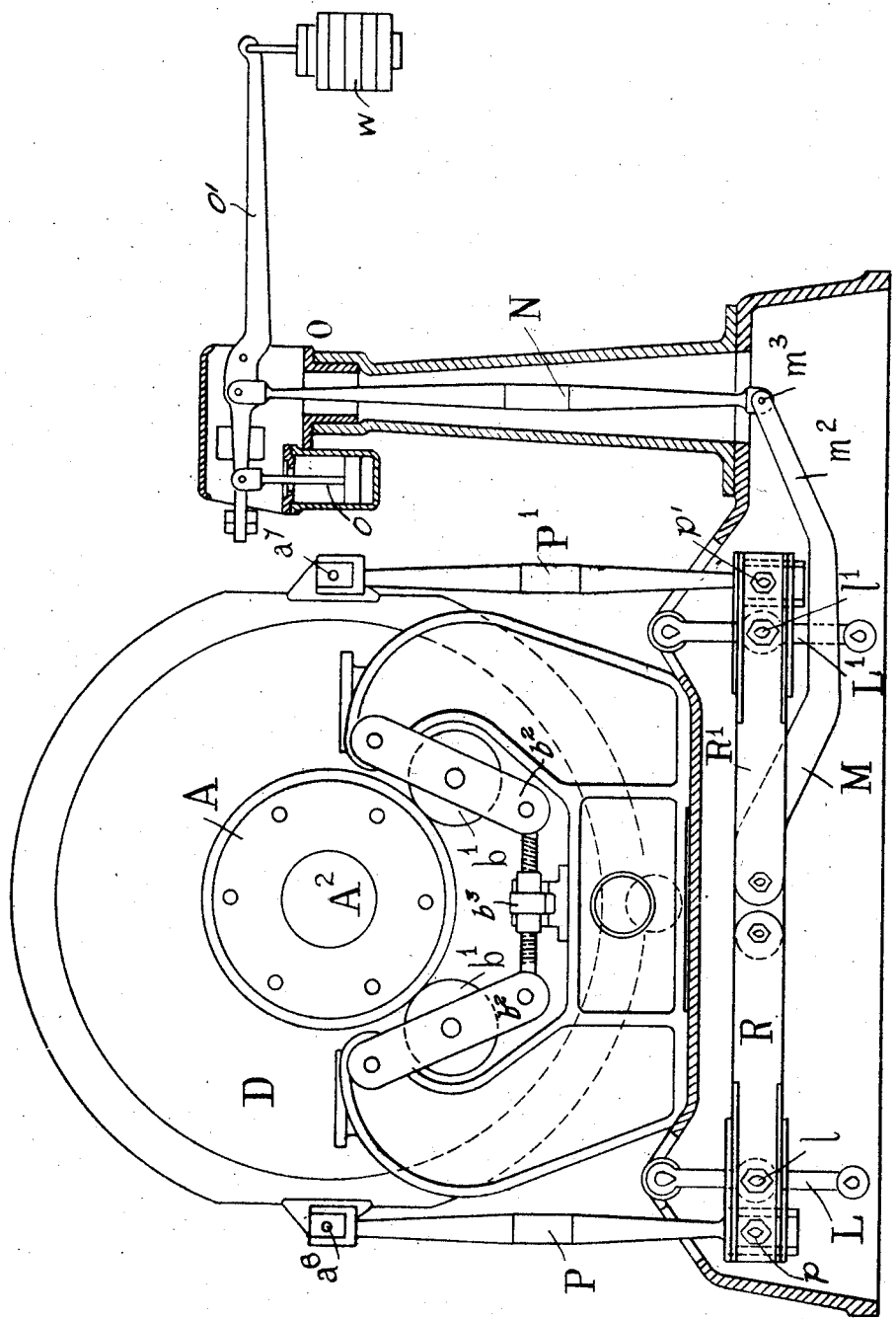

1,627,586

UNITED STATES PATENT OFFICE.

GEORGE HENRY WALKER, OF WORCESTER, ENGLAND, ASSIGNOR TO HEENAN AND FROUDE LIMITED, OF WORCESTER, ENGLAND.

ABSORPTION BRAKE DYNAMOMETER.

Application filed November 3, 1925, Serial No. 66,671, and in Great Britain November 12, 1924.

This invention relates to improvements in absorption brake dynamometers for measuring the power developed by rotating shafts.

In such brakes it is usual to have two elements, the rotor and the stator, and to resist the rotation of the shaft upon which the rotor is mounted by hydraulic means, solid friction, electro magnetic devices or other means. It is well known that when destroying power by such a means the reactionary torque which arises from the act of resisting rotation of the rotor, tends to turn the stator in the same direction as that in which the shaft is revolving, and it is the object of this invention to measure this torque.

According to the invention therefore the stator of the brake or dynamometer is preferably mounted upon anti-friction bearings, rollers or other supports, so that it is free to rotate about the axis of the shaft of the brake. The stator is provided at two diametrically opposite points with pins or knife edges, which are connected through links to a system of levers and weighing appliances, so that the forces tending to turn the stator are transmitted to and reduced by the latter to any predetermined amount.

The invention will be described with reference to the accompanying drawing which shows an elevation partly in section.

The dynamometer is of any ordinary construction with a stator D and a rotor A carried or affixed on a supporting shaft $A^2$ the stator being mounted in suitable anti-friction bearings such as the rollers $b^1$ shown in the drawings the rollers $b^1$ being supported on brackets $b^2$ capable of adjustment by a turnbuckle $b^3$.

Two pins or pivots $a^6$ and $a^7$ are fixed upon the stator D at points upon the horizontal centre line of the stator so that one of the forces arising from the tendency of the stator D to rotate upon its anti-friction supports $b^1$ will be exerted in an upward and one in a downward direction according to the sense of the turning couple.

A link P and $P^1$ is suspended from each pivot $a^6$ or $a^7$ and the lower end of each link P or $P^1$ is pivotally connected at $p$ or $p^1$ with the short arm of a lever R or $R^1$, the levers R and $R^1$ being preferably of either the first or second order. Each lever R and $R^1$ is pivoted upon a fulcrum $l$ or $l^1$ on a link L or $L^1$ pivoted at a point beneath the stator D or in the bed plate supporting the latter, to permit the levers to swing freely through a suitable arc of motion without binding upon their fulcra.

The longer arm of each lever R and $R^1$ therefore exert respectively upward and downward forces, if the direction of rotation be considered as counterclockwise and their ends are connected to a third lever M by means of pins $m$ and $m^1$. This third lever M thus transmits the resultant of these two forces.

The portion $M^2$ of the lever M which forms the long arm of the lever is extended to a convenient point $m^3$ and is coupled up through the link N to a suitable, weighing apparatus O provided with a dash pot $o$, steelyard $o^1$ and weights $w$ capable of measuring the downward force which is exerted upon it due to the turning moment exerted by the stator D.

The apparatus operates in the following manner when the direction of rotation is counterclockwise. The link P at the left hand side of the stator pushes vertically downwards upon the short arm of the lever R. This results in a force of lesser magnitude being exerted in a vertically upward direction at the point $m$. Simultaneously the link $P^1$ on the right hand side of stator transmits a vertically upward force to the short arm of the lever $R^1$, and this results in a vertically downward force at the point $m^1$. The forces at $m$ and $m^1$ together form a couple, the resultant of which is the force pulling vertically downwards upon the link N, which is connected to the scale of the weighing device.

By suitably proportioning the levers R and $R^1$ the force on the link P can be made equal in magnitude to the force on the link $P^1$ and as these two forces operate in opposite directions they do not impose any reaction tending to raise or depress the stator bodily.

What I claim as my invention and desire to protect by Letters Patent is:—

An absorption brake dynamometer for measuring the power developed by rotating shafts comprising a rotor, a stator surrounding the rotor, anti-friction bearings upon which the stator is mounted, a turnbuckle for adjusting the position of the anti-friction bearings, two pivot pins on the stator arranged diametrically opposite each other, levers in the base plate, links pivotally supporting said levers, links connecting the short ends of the levers to the pivot pins on the stator, a further lever connecting the longer ends of the two first levers together and extending beyond the side of the stator, a balance arm and a link connecting the free end of this further lever thereto.

In testimony whereof I have hereunto set my hand.

GEORGE H. WALKER.